(12) United States Patent
Gronneberg

(10) Patent No.: US 8,710,996 B1
(45) Date of Patent: Apr. 29, 2014

(54) INVISIBLE FENCE BATTERY CHARGER

(76) Inventor: Jeffrey Bryan Gronneberg, Prior Lake, MN (US)

( * ) Notice: Subject to any disclaimer, the term of this patent is extended or adjusted under 35 U.S.C. 154(b) by 265 days.

(21) Appl. No.: 13/325,650

(22) Filed: Dec. 14, 2011

(51) Int. Cl.
*G08B 21/00* (2006.01)
(52) U.S. Cl.
USPC ............... 340/636.1; 340/636.2; 320/107; 320/113
(58) Field of Classification Search
USPC ......... 340/636.1, 636.15, 636.17, 636.2, 635, 340/657, 540, 500; 320/107, 110–114, 320/131–135; 439/1, 100, 123, 218
See application file for complete search history.

(56) References Cited

U.S. PATENT DOCUMENTS

| | | | | |
|---|---|---|---|---|
| 4,558,270 A | * | 12/1985 | Liautaud et al. | 320/110 |
| 4,873,479 A | * | 10/1989 | Iimura et al. | 320/110 |
| 5,445,900 A | * | 8/1995 | Miller et al. | 429/1 |
| 6,633,152 B2 | * | 10/2003 | Sharrah et al. | 320/114 |
| 7,557,534 B2 | * | 7/2009 | Uehlein-Proctor et al. | 320/112 |

* cited by examiner

*Primary Examiner* — Anh V La
(74) *Attorney, Agent, or Firm* — David Alan Lingbeck

(57) ABSTRACT

An invisible fence battery charger for dramatically reducing homeowner's yearly invisible fence operating costs and reducing disposal of non-rechargeable batteries. The invisible fence battery charger includes a battery pack including a battery with battery terminals being in communication with the battery.

11 Claims, 3 Drawing Sheets

INVISIBLE FENCE BATTERY CHARGER

BACKGROUND OF THE INVENTION

1. Field of the Invention

The present invention relates to battery packs and more particularly pertains to a new invisible fence battery charger for dramatically reducing homeowner's yearly invisible fence operating costs and reducing disposal of non-rechargeable batteries.

2. Description of the Prior Art

The use of battery packs is known in the prior art. More specifically, battery packs heretofore devised and utilized are known to consist basically of familiar, expected and obvious structural configurations, notwithstanding the myriad of designs encompassed by the crowded prior art which have been developed for the fulfillment of countless objectives and requirements.

One prior art includes a Control Station with Integrated Collar Recharging Docking Station for Pet Electronics Products, comprising a battery recharging docking station powered by an AC/DC converter that receives a corresponding collar/receiver assembly worn by the animal. Another prior art includes an Electronic Device Having a Removable Battery Pack Assembly, comprising a cylindrical battery device wherein the battery may be removed from a housing structure. A third prior art includes a battery pack assembly being removably insertable within a receptacle of the electronic receiver to electrically connect a cylindrical battery contained within the battery pack assembly to internal electronics of the electronic receiver. While these devices fulfill their respective, particular objectives and requirements, the aforementioned patents do not disclose a new invisible fence battery charger.

SUMMARY OF THE INVENTION

The general purpose of the present invention, which will be described subsequently in greater detail, is to provide a new invisible fence battery charger which has many of the advantages of the battery packs mentioned heretofore and many novel features that result in a new invisible fence battery charger which is not anticipated, rendered obvious, suggested, or even implied by any of the prior art battery packs, either alone or in any combination thereof. The present invention includes a battery charging unit including a housing and also including a circuit board being disposed in the housing; and a battery pack including a battery being communicable with the battery charging unit. None of the prior art includes the combination of the elements of the present invention.

There has thus been outlined, rather broadly, the more important features of the invisible fence battery charger in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new invisible fence battery charger which has many of the advantages of the battery packs mentioned heretofore and many novel features that result in a new invisible fence battery charger which is not anticipated, rendered obvious, suggested, or even implied by any of the prior art battery packs, either alone or in any combination thereof.

Still another object of the present invention is to provide a new invisible fence battery charger for dramatically reducing homeowner's yearly invisible fence operating costs and reducing disposal of non-rechargeable batteries.

Still yet another object of the present invention is to provide a new invisible fence battery charger that is environmentally friendly since several million homes utilize invisible fence systems and millions of invisible fence batteries are thrown away each year.

Even still another object of the present invention is to provide a new invisible fence battery charger that is compact, convenient and easy to use to recharge invisible fence batteries used to confine pets such as dogs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which, there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
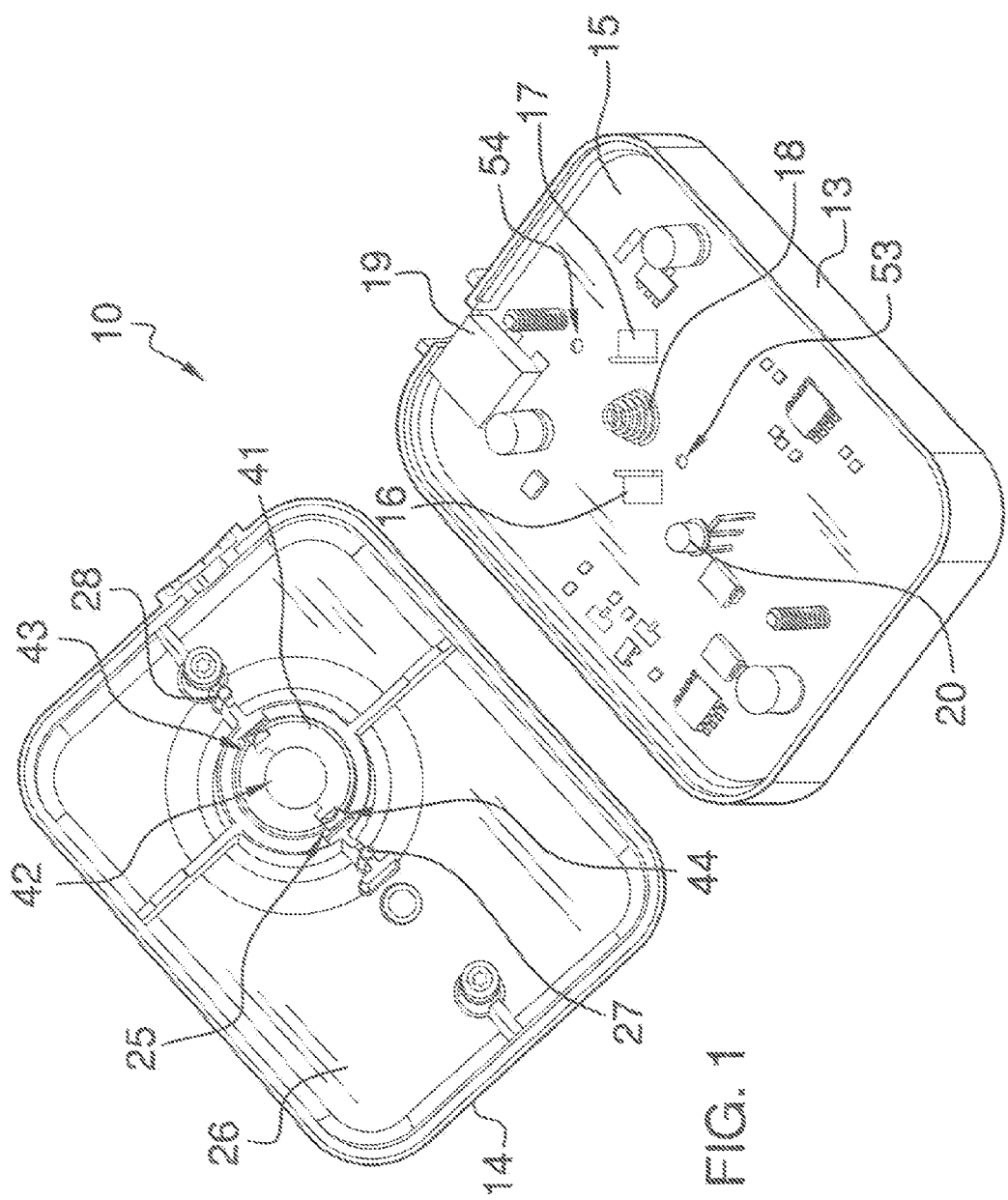
FIG. 1 is an exploded perspective view of a new invisible fence battery charger according to the present invention and showing the battery pack, showing underside of the cover of the battery charging unit, and showing the components of the battery charging unit.
Figure 2:
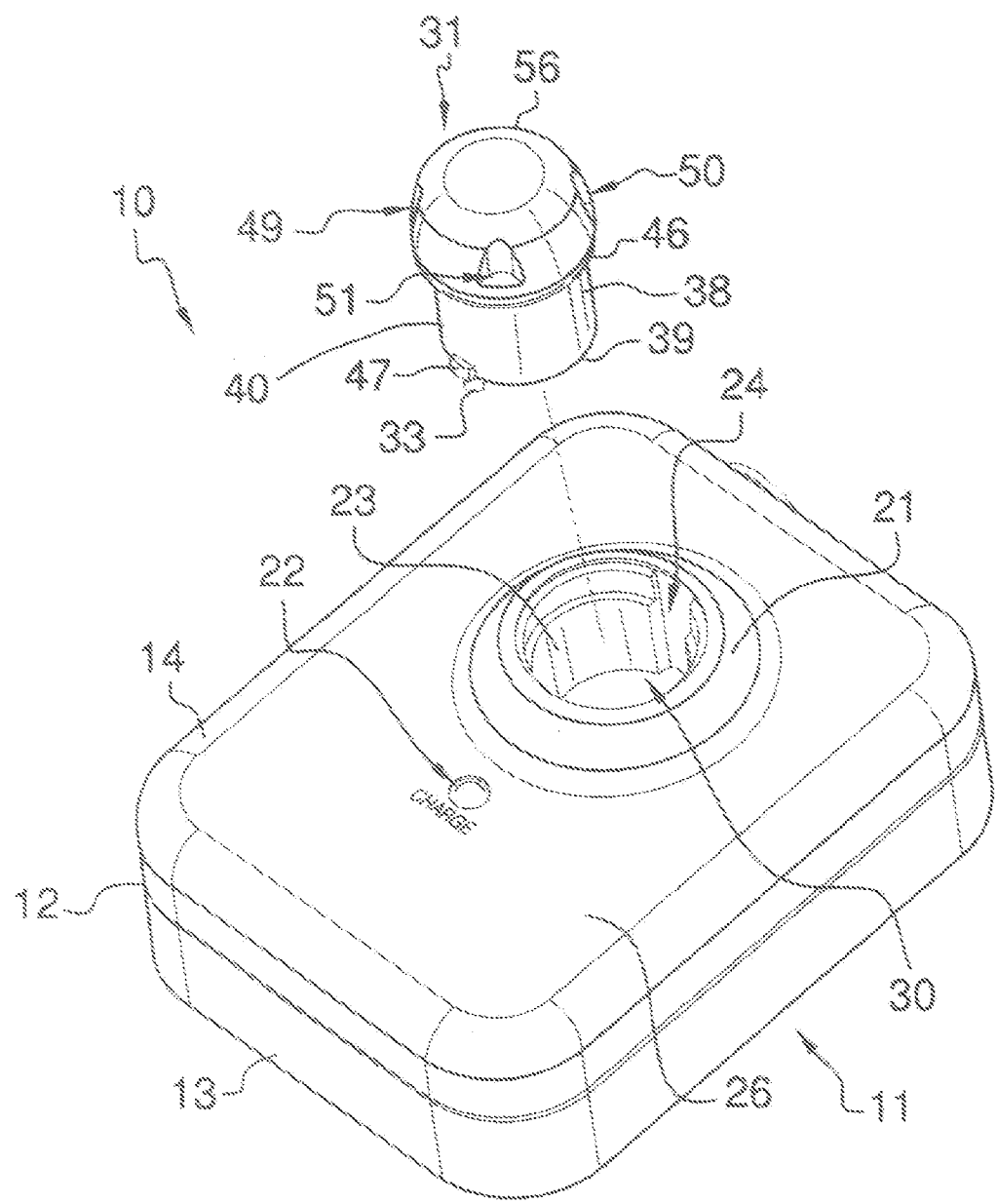
FIG. 2 is an exploded top perspective view of the present invention showing the battery pack and the battery charging unit.
Figure 3:
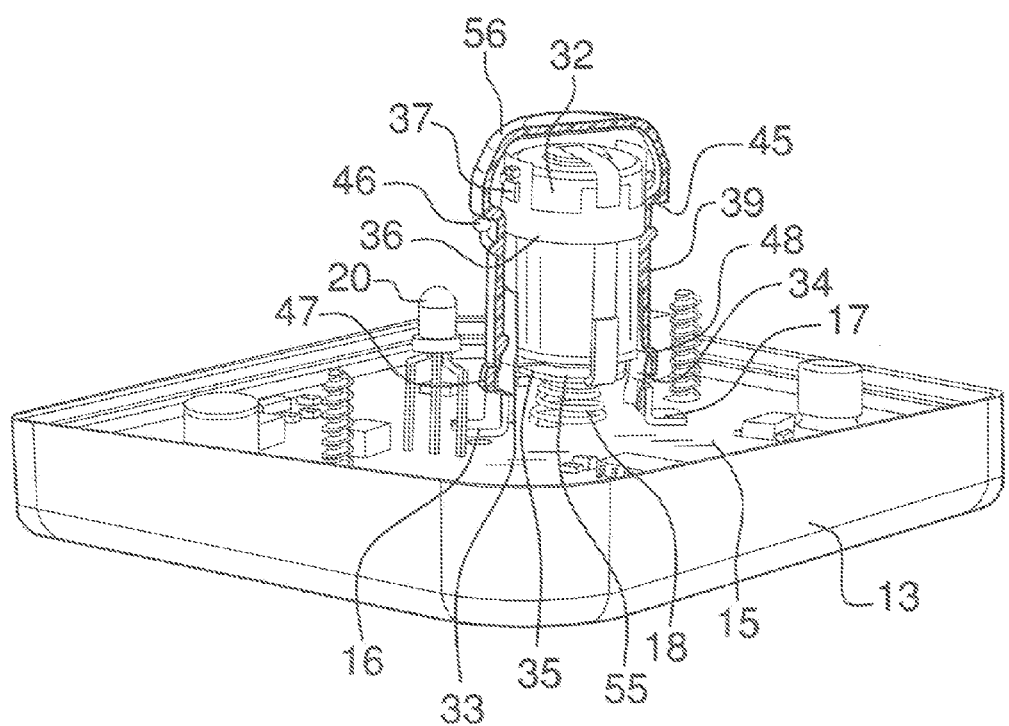
FIG. 3 is a perspective view of the present invention showing a partial cross-section of the battery pack with the battery pack being disposed upon the circuit board of the battery charging unit.

With reference now to the drawings, and in particular to FIGS. 1 through 3 thereof, a new invisible fence battery charger embodying the principles and concepts of the present invention and generally designated by the reference numeral 10 will be described.

As best illustrated in FIGS. 1 through 3, the invisible fence battery charger 10 generally comprises a battery charging unit 11 including a housing 12 and also including a circuit board 15 being conventionally disposed in the housing 12; and a battery pack 31 including a battery 32 being communicable with the battery charging unit 11 when being charged in the battery charging unit 11.

The circuit board 15 includes electrical contacts 16-18 being conventionally disposed upon the circuit board 15 and being communicable with the battery 32 for energizing the battery 32 and also includes a light emitting diode 20 being conventionally disposed upon and extending outwardly from the circuit board 15 and being communicable with the battery 32 to indicate the charging state of the battery 32 such as when the battery 32 is charging and when the battery 32 is completely charged. The electrical contacts 16-18 include static electrical contacts 16,17 each having a first portion and a second portion angled relative to the first portion and being spaced apart and slightly raised and being made of conductive material, and also include a biased electrical contact 18 being conventionally disposed between the static electrical contacts 16, 17 and extending outwardly from the circuit board 15 and is essentially a biased element such as a compression spring made of conductive material.

The battery charging unit 11 further includes a power supply jack 19 being conventionally connected to and along an edge of the circuit board 15. The AC current from a power supply is converted to DC current in the electrical plug which is in conventional communication to both an electrical outlet and to the power supply jack 19 which energizes and charges the battery 32.

The housing 12 is made of any suitable material and includes a base 13 and a cover 14 being conventionally fastenable to the base 13 and having a main wall 26 and also having a battery-receiving opening 30 being disposed through the main wall 26 and further having a light-receiving hole 22 being disposed through the main wall 26. The cover 14 further includes slots 24,25 being disposed in a side wall 23 forming the battery-receiving opening 30 with the battery-receiving opening 30 being aligned with the electrical contacts 16-18. The slots 24,25 extend longitudinally through top and bottom edges of the side wall 23. The cover 14 also includes a boss 21 being conventionally disposed upon the main wall 26 with the battery-receiving opening 30 being disposed through the boss 21. The cover 14 further includes alignment members 27,28 such as pins, poles, or pegs being conventionally attached to and depending from a bottom of the main wall 26. The circuit board 15 further includes holes 53,54 being disposed therethrough with the alignment members 27,28 being received in the holes 53,54 upon the cover 14 being fastened upon the base 13.

The battery pack 31 includes battery terminals 33-35 being conventionally connected to the battery 32. The battery terminals 33-35 include cantilevered battery terminals 33,34 being cantilevered from a bottom of the battery 32 and being in contactable relationship with the static electrical contacts 16,17 respectively. The cantilevered battery terminals 33,34 are conventionally connected at a perimeter of the battery 32 and are opposed to one another with the cantilevered battery terminals 33,34 being transversely curved. The battery terminals 33-35 also include a proximate battery terminal 35 being in communication with and conventionally disposed below the battery 32 between the cantilevered battery terminals 33,34 and being in contactable relationship with the biased electrical contact 18. The proximate battery terminal 35 has a planar portion 55 which is disposed below the battery 32 between the cantilevered battery terminals 33,34 and also has wing portions being conventionally attached to the battery 32. The battery pack 31 also includes a circuit element 36 being in conventional communication with the battery terminals 33-35 and being conventionally disposed about the battery 32. The battery pack 31 further includes a battery protection circuit module 37 being in conventional communication with the circuit element 36 to protect against over discharging, over charging and short circuiting.

The battery pack 31 also includes a housing member 38 for carrying the battery 32, and further includes battery guide members 47,48 being conventionally disposed upon the housing member 38 and being receivable in the slots 24,25 for guiding the battery pack 31 into the battery-receiving opening 30. The housing member 38 is made of any suitable material and includes an upper portion 56 and a lower portion 39. The lower portion 39 has a side wall 40 and a bottom wall 41 with the bottom wall 41 having a centrally-disposed opening 42 being disposed therethrough and being aligned with the biased electrical contact 18 when the battery 32 is inserted into the battery charging unit 11 and also aligned with the proximate battery terminal 35. The bottom wall 41 also has holes 43,44 being disposed therethrough with the cantilevered battery terminals 33,34 each being disposed through a respective hole 43,44. The battery guide members 47,48 are tabs being conventionally disposed on the side wall 40 of the housing member 38 and near a bottom of the lower portion 39 and each being dimensioned to be removably received in a respective slot 24,25. The upper portion 56 has an endless eave 45 dividing the upper and lower portions 39,56 and also has recessed portions 49-51 being disposed thereabout and therein for aiding insertion of the battery pack 31 into the battery charging unit 11. The battery pack 31 further has an O-ring 46 being conventionally disposed about the housing member 38 and being conventionally disposed adjacent to the endless eave 45 for sealing the battery pack 31 to a collar.

In use, the user plugs the battery charging unit 11 into an electrical outlet using a suitable power cord which also plugs into the power supply jack 19. The user inserts the battery pack 31 bottom first into the battery-receiving hole 30 by aligning the tabs 47,48 with the slots 24,25 so that the battery pack 31 slides down into the battery-receiving hole 30 so that the tabs 47,48 completely pass through the slots 24,25 with the user then rotating the battery pack 31 so that the battery terminals 33-35 make contact with the respective electrical contacts 16-18. The tabs 47,48 as a result of being rotated will be engaged to the bottom edge of the side wall 23 of the battery-receiving opening 30. The light-emitting diode 20 indicates the charging of the battery 32 and also when the battery 32 is fully charged. Once the battery 32 is fully charged, the user again rotates the battery pack 31 to align the tabs 47,48 with the slots 24,25 and then pulls the battery pack 31 out of the battery-receiving opening 30 and can now put the battery pack 31 in the collar used for confining a pet in particular.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invisible fence battery charger. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An invisible fence battery charger comprising a battery charging unit having a housing and also having electrical contacts, wherein said electrical contacts include at least one static electrical contact and also include a biased electrical contact, wherein said housing includes a base and a cover being fastenable to said base and having a main wall and also having a battery-receiving opening being disposed through said main wall, wherein said cover further includes at least one slot being disposed in a side wall forming said battery-receiving opening for receiving and guiding a battery pack into communication with said electrical contacts; wherein said battery-receiving opening is aligned with said electrical contacts, wherein said at least one slot extends longitudinally through top and bottom edges of said side wall.

2. An invisible fence battery charger as comprising a battery charging unit having a housing and also having electrical contacts, wherein said electrical contacts include at least one static electrical contact and also include a biased electrical contact, wherein the invisible fence battery charger further includes a battery pack including a battery; wherein said battery pack includes battery terminals being in communication with said battery and adapted to being communicable with said electrical contacts, wherein said battery terminals include at least one cantilevered battery terminal being cantilevered from a bottom of said battery and adapted to being communicable with said at least one static electrical contact, said at least one cantilevered battery terminal being connected at a perimeter of said battery.

3. The invisible fence battery charger as described in claim 2, wherein said battery terminals also include a proximate battery terminal being in communication with and spaced below said battery proximate to said at least one cantilevered battery terminal, and also being communicable with said biased electrical contact.

4. The invisible fence battery charger as described in claim 3, wherein said proximate battery terminal has a planar portion which is spaced below and parallel to said battery proximate to said at least one cantilevered battery terminal.

5. The invisible fence battery charger as described in claim 2, wherein said battery pack also includes a circuit element being in communication with said battery terminals and being disposed about said battery.

6. The invisible fence battery charger as described in claim 5, wherein said battery pack further includes a battery protection circuit module being in communication with said circuit element to protect against over discharging, over charging and short circuiting.

7. The invisible fence battery charger as described in claim 3, wherein said battery pack also includes a housing member for carrying said battery, and further includes at least one battery guide member being disposed on said housing member.

8. The invisible fence battery charger as described in claim 7, wherein said housing member includes an upper portion and a lower portion.

9. The invisible fence battery charger as described in claim 8, wherein said lower portion has a side wall and a bottom wall, wherein said bottom wall has a centrally-disposed opening being disposed therethrough and being aligned with said proximate battery terminal, wherein said bottom wall also has at least one hole being disposed therethrough, wherein said at least one cantilevered battery terminal is disposed through said at least one hole.

10. The invisible fence battery charger as described in claim 9, wherein said at least one battery guide member is a tab being disposed on said side wall and near a bottom of said lower portion of said housing member.

11. The invisible fence battery charger as described in claim 10, wherein said upper portion has an endless eave dividing said upper and lower portions and also has recessed portions being disposed and spaced thereabout and therein for aiding insertion of said battery pack into a battery charging unit, said battery pack further having an O-ring being disposed about said housing member adjacent to said endless eave for sealing said battery pack to a collar.

* * * * *